Patented March 22, 1904.

UNITED STATES PATENT OFFICE.

WALTER MILLS, OF LONDON, ENGLAND, ASSIGNOR TO A. O. GRANGER, OF CARTERSVILLE, GEORGIA.

METHOD OF MAKING FLUORIDS AND SILICATES.

SPECIFICATION forming part of Letters Patent No. 755,379, dated March 22, 1904.

Application filed May 25, 1903. Renewed February 24, 1904. Serial No. 195,111. (No specimens.)

*To all whom it may concern:*

Be it known that I, WALTER MILLS, a subject of the King of Great Britain, residing in London, England, have invented certain new and useful Improvements in Manufactures of Fluorids and Silicates, of which the following is a specification.

This invention relates to the manufacture of fluorids and silicates of various metals, whose silicofluorids are obtained from silicofluorid of lead prepared readily and economically by the reaction between metallic lead or its ores and hydrofluosilicic acid, which when sufficiently concentrated, and particularly when the concentrated acid is heated, readily attacks and dissolves metallic lead and its ores, especially galena and cerusite.

In carrying the present improvements into practice a solution of silicofluorid of lead is prepared by acting upon excess of lead or of the crushed ores with hydrofluosilicic acid, the mixture being placed in a pan or other proper receptacle and heat being applied until the mass is substantially dry. I find that the acid begins to attack and dissolve the substance when its specific gravity is about 1.80. In the event that scrap-lead is used the action of the acid is somewhat accelerated by blowing air through the mass. Warm water is then added to the substance in the pan, whereby an aqueous solution of silicofluorid of lead is obtained. By adding to this aqueous solution nitrate of calcium, potassium, or sodium, either in aqueous solution or in fine powder, the silicofluorid of the respective metals is precipitated, while nitrate of lead remains in solution. After drawing off the nitrate of lead the silicofluorid is first washed and then dried at about 100° centigrade and the temperature then gradually raised. At about 350° centigrade the silicofluorid is decomposed into a metallic fluorid and gaseous silicon tetrafluorid. This gas may be brought into contact with water by any convenient means, whereupon the well-known double reaction takes place, hydrofluosilicic and silicic acids being produced in accordance with the equation

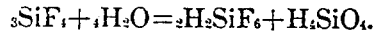

A small quantity of the silica dissolves in the hydrofluosilicic acid, but almost all is precipitated. When washed with water and dried, almost chemically-pure silica in an exceedingly fine state of division is thus obtained.

For the purpose of manufacturing the respective silicates—as, for instance, the silicate of sodium or potassium—I mix finely-divided sand or similar silicious material with the metallic silicofluorid in approximately molecular proportions and then heat the mixture to a slightly-greater extent than when preparing the metallic fluorids, as aforesaid. Under these circumstances all the fluorin is expelled from the mixture, which when, *e. g.*, sodium silicofluorid is used undergoes a reaction in accordance with the equation

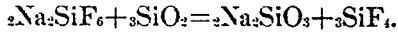

The silicon tetrafluorid may be used as before for the preparation of hydrofluosilicic acid.

It is to be understood that I do not confine myself to the preparation of silicates of sodium and potassium containing silica in precisely the proportions indicated by the equation. Where silicates containing a greater proportion of silica are required, I obtain them by increasing the quantity of silicious material which is mixed with the metallic silicofluorid.

Having described my invention, I claim—

1. The process of manufacturing metallic fluorids which consists in precipitating the silicofluorid of the metal from a solution of silicofluorid of lead by adding thereto a nitrate and then subjecting the precipitated silicofluorid to the requisite amount of heat to form the compound desired.

2. The process of manufacturing metallic fluorids which consists in precipitating the silicofluorid of the metal from a solution of silicofluorid of lead by adding thereto an alkali nitrate, and then subjecting the precipitated silicofluorid to the requisite amount of heat to form the compound desired.

3. The process of manufacturing metallic fluorids which consists in dissolving lead-carrying substances in heated concentrated hydrofluosilicic acid; in then precipitating the hydrofluosilicic acid with an alkali nitrate, and in then subjecting the precipitated silicofluorid to the requisite amount of heat to form the compound desired.

4. The process of manufacturing metallic silicates which consists in dissolving lead or a lead-carrying compound in heated concentrated hydrofluosilicic acid; in then precipitating the hydrofluosilicic acid with a nitrate; in then mixing the precipitated silicofluorid with silicious material; and in then subjecting the mixture to the requisite amount of heat to form the silicate desired.

Signed at Nos. 9 to 15 Murray street, New York, N. Y., this 23d day of May, 1903.

WALTER MILLS.

Witnesses:
FRED. J. DOLE,
JOHN O. SEIFERT.